US011658826B2

(12) United States Patent
Biesterveld et al.

(10) Patent No.: US 11,658,826 B2
(45) Date of Patent: May 23, 2023

(54) DYNAMIC SELF-DEFINED API VIA DIGITAL SIGNATURES

(71) Applicant: FIDELITY INFORMATION SERVICES, LLC, Jacksonville, FL (US)

(72) Inventors: Scott Biesterveld, New Berlin, WI (US); Senthil Senthil, Menomonee Falls, WI (US); Vangchay Sayaovong, Milwaukee, WI (US); Thomas David Ruppel, Jacksonville, FL (US)

(73) Assignee: Fidelity Information Services, LLC, Jacksonville, FL (US)

( * ) Notice: Subject to any disclaimer, the term of this patent is extended or adjusted under 35 U.S.C. 154(b) by 417 days.

(21) Appl. No.: 16/820,519

(22) Filed: Mar. 16, 2020

(65) Prior Publication Data
US 2020/0396086 A1 Dec. 17, 2020

Related U.S. Application Data

(63) Continuation of application No. 16/440,607, filed on Jun. 13, 2019, now Pat. No. 11,570,004.

(51) Int. Cl.
| *H04L 9/32* | (2006.01) |
| *G06F 16/22* | (2019.01) |
| *G06F 9/54* | (2006.01) |
| *G06F 21/64* | (2013.01) |
| *G06F 21/62* | (2013.01) |

(52) U.S. Cl.
CPC .............. *H04L 9/3247* (2013.01); *G06F 9/54* (2013.01); *G06F 16/2282* (2019.01); *G06F 21/64* (2013.01); *G06F 9/547* (2013.01); *G06F 21/6227* (2013.01)

(58) Field of Classification Search
USPC ........................................................ 713/176
See application file for complete search history.

(56) References Cited

U.S. PATENT DOCUMENTS

| 10,021,062 | B2 * | 7/2018 | LeVasseur | ............ H04L 51/234 |
| 10,970,393 | B1 * | 4/2021 | Stiles | ..................... G06F 21/554 |
| 11,157,498 | B1 * | 10/2021 | James | ..................... G06F 9/542 |
| 2007/0226504 | A1 * | 9/2007 | de la Iglesia | ......... H04L 63/123 |
| | | | | 713/176 |

(Continued)

FOREIGN PATENT DOCUMENTS

DE          102015209754 A1 * 12/2015    ............. H04L 67/16

*Primary Examiner* — Sakinah White Taylor
(74) *Attorney, Agent, or Firm* — Finnegan, Henderson, Farabow, Garrett & Dunner LLP

(57) ABSTRACT

Systems and methods are provided for interacting with an Application Programming Interface (API) using a digital signature. In one embodiment, a system includes one or more processors that execute the instructions to perform operations. The operations may include receiving a first digital signature from a requesting device, the first digital signature being associated with a first set of fields in the database; identifying one or more requested fields; accessing the database to retrieve the information associated with the one or more requested fields, the information being associated with at least one API; and providing a response to the requesting device to cause a requesting application to consume the response from the API.

19 Claims, 8 Drawing Sheets

(56) References Cited

U.S. PATENT DOCUMENTS

| | | | |
|---|---|---|---|
| 2009/0158433 A1* | 6/2009 | Li | H04L 63/1416 726/24 |
| 2011/0010715 A1* | 1/2011 | Papakipos | G06F 9/544 718/100 |
| 2013/0145348 A1* | 6/2013 | Agovic | G06F 16/252 707/610 |
| 2016/0337346 A1* | 11/2016 | Momchilov | G06F 21/41 |
| 2017/0046134 A1* | 2/2017 | Straub | G06F 8/34 |
| 2017/0364701 A1* | 12/2017 | Struttmann | G06F 21/78 |
| 2018/0359264 A1* | 12/2018 | Sweet | H04L 9/0819 |
| 2019/0042588 A1* | 2/2019 | Bregler | G06F 16/13 |
| 2019/0236562 A1* | 8/2019 | Padmanabhan | G06Q 40/12 |
| 2019/0334726 A1* | 10/2019 | Kelly | H04L 9/3247 |

\* cited by examiner

DYNAMIC SELF-DEFINED API VIA DIGITAL SIGNATURES

CROSS REFERENCE TO RELATED APPLICATIONS

This application is a continuation of U.S. patent application Ser. No. 16/440,607, filed on Jun. 13, 2019, currently pending. The above-referenced application is incorporated herein by reference in its entirety.

FIELD

The present disclosure generally relates to computer systems and software applications and, more particularly, to communications involving computer systems and software applications via computer networks and the Internet.

BACKGROUND

To provide multiple consumers access to an API, the API provider may create separate APIs for each API consumer. each application, each use case in each application, etc. Each separate API requires its own development, testing, and deployment, as well as support for the consumer using a unique API. This approach creates administrative challenges in managing the different versions of API source code for each one of the different API consumers. For example, providing custom enterprise APIs to each one of hundreds or thousands of different parties dramatically increases complexity, maintenance, and costs.

As such, a need exists for systems and methods that provide a single, flexible enterprise API that can be adapted to each API consumer's situational needs.

SUMMARY

Embodiments of the present disclosure are directed to methods, systems, and computer-readable media for providing dynamic, self-defined Application Programming Interfaces (APIs) using digital signatures. In one embodiment, a computer system comprises a database storing information associated with a plurality of fields; one or more memories storing instructions; and one or more processors configured to execute the instructions to perform operations. The operations comprise receiving a digital signature from a requesting device, the digital signature comprising an array of one or more bits, wherein each of the one or more bits has an associated bit position in the array and each position in the array is associated with one of multiple fields of an API; identifying one or more requested fields, wherein a requested field is associated with a bit having a value of True in the array; accessing a database to retrieve data associated with the one or more fields of the API based on analyzing the digital signature, the information being associated with at least one Application Programming Interface.

Methods and computer-readable media (e.g., such as non-transitory computer-readable media) that perform the above operations are also provided.

Additional objects and advantages of the embodiments will be set forth in part in the description which follows, and in part will be evident from the description, or may be learned by practice. The objects and advantages will be realized and attained by means of the elements and their combinations particularly pointed out in the appended claims.

It is to be understood that both the foregoing general description and the following detailed description are exemplary and illustrative and are not restrictive of the claims.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears generally is indicated by the left-most digit in the corresponding reference number.

DETAILED DESCRIPTION

Figure 1:
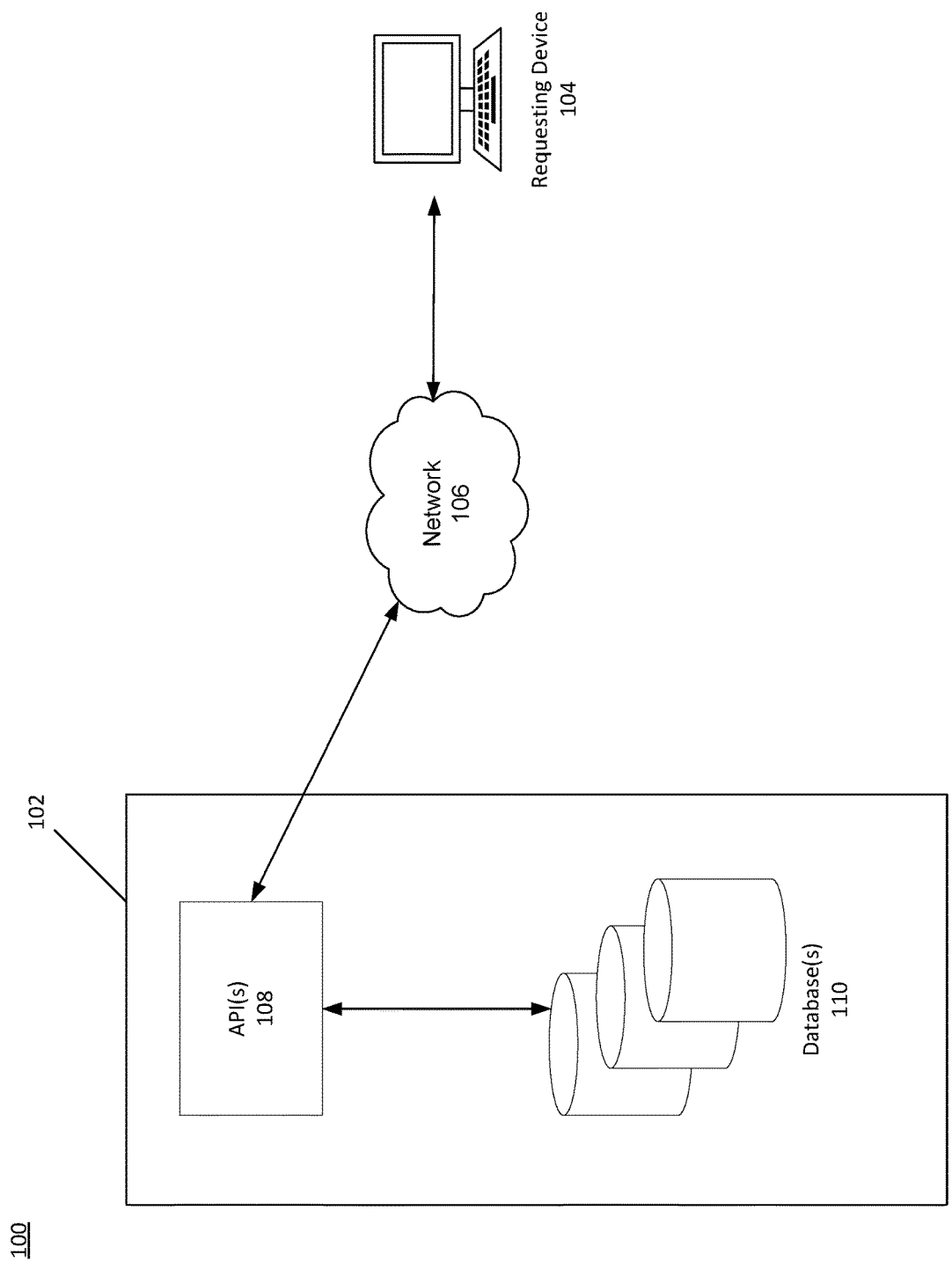
FIG. 1 depicts an exemplary system for performing disclosed embodiments.

Example embodiments of this disclosure relate to improved systems, methods, and computer program products for providing services associated with dynamic, self-defined APIs using digital signatures. In various examples, a digital signature may be used to identify the available fields that an API consumer desires to use from a dynamic, self-defined API. In addition, a unique digital signature may exist for every combination of available fields that an API consumer could request from a dynamic, self-defined API, providing each distinct API consumer the flexibility to access any specific combination of available API fields without wasting processing power or retrieving unnecessary fields and data. In various examples, the term "digital signature" generally may include, but is not limited to, any data structure, for example, a sequence or array of bits.

Today, web-enabled enterprise systems and big data create a number of technologic challenges. Data sets may include hundreds or thousands of fields. Extending these hundreds or thousands of fields generally can result in millions, tens of millions, hundreds of millions of unique field combinations. Thus, it is difficult to manage enterprise level APIs across thousands of customers who each have unique requirements.

Typical API's are static, such that if one client has different needs that are not met by the static API, a new and separate version must be created for that client. This current static API model requires numerous versions of an API to satisfy the needs of different parties and requires storage overhead, as well as management of each additional API (e.g., version control, troubleshooting, updates, etc.). For example, the static API model may require that each version of the API be regression tested as future releases are made available.

An alternative approach to providing an API for each client is to retrieve all possible fields from a single API and then filter out the fields an individual client needs. However, this approach requires storing the configuration for each client and adds the overhead of retrieving every field from the database when a smaller subset is desired by the client.

Systems and methods for providing an API to multiple requesting devices that each have varying field requirements presents a number of technical challenges. Each requesting device, such as a computing device executing an application, may use a different subset of fields from the API. For example, by using a single API, each consumer may be forced to receive more fields and data than they desire. Further, a number of different parties operating various software applications may use the single API to retrieve data specific to each respective application. While each API consuming application may be able to filter the fields after the fact, this results in inefficient use of computing resources and wasted computing capacity across various computer systems (e.g., server machines, client devices, web servers, application servers, cloud servers, database systems, server applications, client applications, networking devices, computer networks, etc.).

Described herein are systems and methods for providing a single, dynamic API that is capable of serving one or more clients with different requirements. For example, a dynamic API at the enterprise level may allow each party using the API a self-service platform through which to access any combination or number of fields depending on the party's goals and requirements. The dynamic API may be provided and maintained by a service provider system, such as an enterprise software provider. In some embodiments, the dynamic API may be operable in two modes (each of which are described in detail below): a signature generation mode and an invocation mode. In the signature generation mode, the client may select a subset of fields from the full set of fields available via the API. The signature generation mode then may provide the client with a digital signature representing the subset of fields for use with the API. Each unique combination of data fields associated with a dynamic API may have its own digital signature. The client can dynamically obtain multiple signatures for different purposes such that each unique signature provides a tailored combination of a subset of fields available from an API. The digital signature may be stored by the client and provided to the service provider system when calling the dynamic API, for example, to request a specific subset of dynamic API fields and associated data. Additionally, if the client requirements change and the client requires a new subset of fields, the client may dynamically create and immediately use a new digital signature.

In some embodiments, the client may store and use any number of digital signatures with the dynamic API, for example, across various applications or within different parts of the same application that relies on the service provider API. For example, a client may store several digital signatures for use with the dynamic API, each digital signature requesting a unique subset of fields. Thus, a client may use the single, dynamic API for multiple purposes by calling the dynamic API with different signatures.

In some embodiments, the invocation mode may be implemented for a dynamic customer profile API that may be configured to receive the digital signature and generate a dynamic customer profile response that is associated with the customer based on the fields indicated in the digital signature. The dynamic customer profile API invocation mode may enable a user to interact with the API to access the fields associated with the digital signature.

In some embodiments, the service provider system maintains the dynamic API, making it easier to add new functionality with less regression testing as the service provider tests a single version of code. Additionally, the process of retrieving fields available from an API based on a digital signature is more efficient than the previously described methods since the dynamic API retrieves data for a unique combination of fields requested by the client based on a provided digital signature. Instead of using a process that retrieves a large volume of data associated with every field available from an API and then filtering the large volume of data according to the requirements of the application that consumes the data, the client may fine tune the process using one or more digital signatures each making a specific call to a single, unitary enterprise API as efficient as possible in retrieving and/or otherwise using associated API fields and data. Channel efficiency is especially important for mobile applications, which send and receive data, for example, over a packet switched network or a wireless local area network. In some implementations, channels could use machine learning and leverage the dynamic API to automatically create integration to the dynamic API for the channel. For example, a mobile channel may benefit from a minimal digital signature to allow the request/response to be as efficient as possible Systems and methods described herein have the advantage of expanding upon the current request/response API model to a more complex and analytical API model that is centralized, flexible, and adaptable. For example, the dynamic API may enable clients to develop software differently and to use a single API to meet multiple needs, thereby reusing code without the need to develop and test a version for each need. A consumer of the API may manipulate the digital signatures in different situations when using the dynamic API, for example, by calling the enterprise API multiple times using different signatures in each call. In another example, the dynamic API may influence integration and interface discovery. For example, a client may call the dynamic API several times, each with a different digital signature, obviating the need to call several APIs or to filter out extra data that may be returned each time a static API is called.

Examples described herein describe an inquiry API, e.g., an API configured to query one or more databases of the service provider. However, disclosed systems and methods may also be used for APIs providing other functionality, for example, update and/or create APIs, access APIs, algorithmic APIs, etc.

In some embodiments, the digital signature may be passed to the dynamic API as an input parameter to identify which fields the client wants to retrieve. Those fields may be obtained and returned to the client of the dynamic API. The client may dynamically create the digital signature through a user interface (UI) and begin using the signature immediately with no assistance needed from the dynamic API provider. In various examples, the client is not limited to generating, storing, and/or using any number of digital signatures and may generate new digital signatures as desired (e.g., during development of client software, on the fly during execution of an application based on relevant data fields, etc.).

In some embodiments, the dynamic API provider may store permissions information indicative of fields a certain customer has permissions to access. Permissions information may be verified upon creation of a digital signature by a customer. For example, prior to generating the digital signature, the system may query a permissions database to verify whether the customer is authorized to access the requested fields.

FIG. 1 depicts an exemplary system 100 for implementing the disclosed embodiments. System 100 may be a computing system configured to receive and send information between the components of system 100 and/or with components outside of system 100. System 100 includes a service provider system 102 and one or more device(s) 104, which may be connected by a network 106. It should be understood, however, that system 100 may include additional and/or alternative components.

Service provider system 102 also includes one or more dynamic API(s) 108 and one or more databases 110. In some examples, service provider system 102 may be an entity that provides software applications (e.g., enterprise web-based software applications via the Internet), information technology solutions, data storage solutions, etc. In one example, service provider system 102 may include a service provider system that provides one or more dynamic API(s) 108 that requesting device 104 may call, thereby invoking server software to process the API request, retrieve data from databases(s) 110 based on the request, and return said data to the client. query and retrieve data from database(s) 110. In some embodiments, database(s) 110 may include any data source, for example, data may be provided via internal APIs, external APIs, web services, other applications, etc.

In some embodiments, service provider system 102 may include one or more computer memory devices and one or more hardware processors and/or virtual processors (e.g., one or more hardware processors assigned to a virtual machine). In some examples, the one or more processors may implement virtual machine technologies, may be part of a distributed system (e.g., a cluster), may be hosted in a data center, or may be implemented using similar known technologies to provide the ability to execute, control, run, manipulate, store, etc. multiple software processes, applications, programs, etc.

Requesting device 104 may include one or more computing devices configured to perform one or more processes consistent with the disclosed embodiments. For example, requesting device 104 may include a notebook computer, a mobile device with computing ability, a server, a desktop computer, tablet, or any combination of these computers and/or affiliated components. For example, requesting device 104 may be a smartphone, which is adapted to perform one or more actions consistent with the disclosed embodiments. In another embodiment, requesting device 104 may be a server machine that runs an application server(s), web server(s) and/or any other type(s) of server software applications, a wearable device, a vehicle, an IoT device, set top box, camera device, network router, network switch, virtual reality hardware, augmented reality hardware, etc.

In some examples, requesting device 104 may be associated with one or more users and/or clients. In one embodiment, the user may be a party or entity. In some embodiments, each party/entity may be independently managed and authorized to use a dynamic API. For example, each party/entity may have a different set of permissions to access a subset of fields. Each entity also may have one or more users that use one or more software applications that call/use dynamic API(s). These entities may be unassociated with each other and separately managed by an enterprise service provider, e.g., service provider system 102. Service provider system 102 may, for example, include a permissions database storing, for each entity, a subset of the available fields that the entity is authorized to access. In another embodiment, a user may be one or more applications stored on a requesting device. The user associated with requesting device 104 may have a relationship with a service provider of service provider system 102. For example, the user associated with requesting device 104 may be a client of the service provider or a user associated with the client. The user or client associated with requesting device 104 may use dynamic API 108, provided by the service provider, to retrieve data from databases 110.

In one aspect, requesting device 104 may be one or more computing devices including one or more processing components that perform client device functions, such as a smart phone, a tablet, a laptop, a personal digital assistant, or another form of client device. In one embodiment, requesting device 104 may contain one or more processors, one or more I/O devices, one or more memory devices, and other components. Requesting device 104's memory device(s) may be configured to store information, including digital signatures, used by the device's processor to perform certain functions related to disclosed embodiments. The memory devices may be volatile or non-volatile, and may be removable. In one embodiment, requesting device 104 may be associated with a client. In certain examples, the client may be a consumer or a potential consumer of the service provider.

In various examples, requesting device 104 connects to network 106 or other elements of system 100 through the Internet or other communication network(s) and may use one or more protocols, including, but not limited to, Universal Serial Bus (USB), Bluetooth, hardware plug-ins, WiFi and other wireless local area network (WLAN) protocols, 3G/4G/LTE and/or other wide area network (WAN) protocols. In some embodiments, network 106 may comprise a software-defined network (SDN).

In some embodiments, network 106 is adapted to facilitate communication of data between service provider system 102 and requesting device 104 and may be any type of network suitable for the movement of data. For example, network 106 may be, or may comprise all, or a portion of, a local area network (LAN), public switched telephone network, the Internet, or any other network suitable for communicating data. Network 106 may comprise a combination of discrete networks which may use different technologies. For example, network 106 may comprise local area networks (LANs), wide area networks (WAN's), or combinations thereof and may employ any suitable topology including wireless and wireline networks.

In some embodiments, database(s) 110 may be Oracle™ databases, Sybase™ databases, or other relational databases or non-relational databases, such as Hadoop sequence files, HBase, or Cassandra. Database(s) 110 or other files may include, for example, data and information related to the source and destination of a network request, the data associated with the request, etc. Systems and methods of disclosed embodiments, however, are not limited to separate databases. In some examples, service provider system 102 may include, reference, and/or otherwise directly or indirectly access one or more data repositories. For example, an API of service provider system 102 may use a peripheral manager to access one or more locally stored databases in addition to or in lieu of accessing one or more databases over a network. In some examples, a data repository may be located remotely from service provider system 102 and/or accessed via one or more data virtualization layers.

Figure 2:
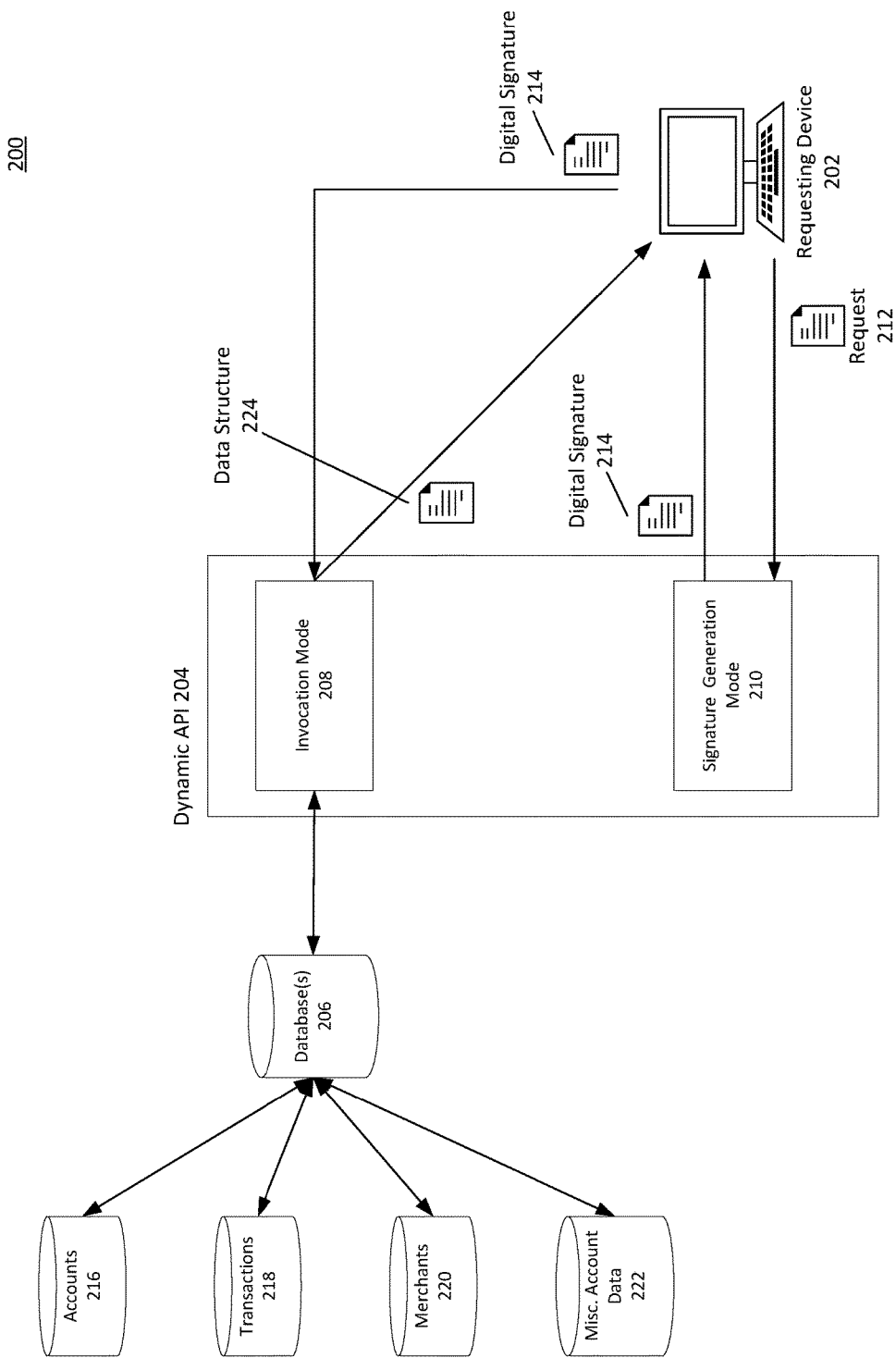
FIG. 2 depicts exemplary process for generating and using a digital signature, consistent with disclosed embodiments.

FIG. 2 is an exemplary interaction between a requesting device 202, dynamic API 204, and database(s) 206. Various examples described with reference to FIG. 2 may occur via network 106.

As shown in FIG. 2, dynamic API 204 may be operable in one or more modes, e.g., using invocation mode 208 and signature generation mode 210. In some embodiments, dynamic API 204 may include additional modes. For example, dynamic API 204 may include a mode in which a user, via a graphical user interface (GUI) may test a digital signature with or without causing dynamic API 204 to execute a query against database(s) 206. The one or more modes of the dynamic API 204, including invocation mode 208 and signature generation mode 210, may be one or more software modules.

To initiate the signature generation process (described in further detail below), requesting device 202 may transmit a request 212 to signature generation mode 210 via network 106. Request 212 may include, for example, an indication received programmatically and/or via a GUI of one or more unique field combinations desired by requesting device 202. In some examples, the signature generation mode 210 of dynamic API 204 may receive request 212 and generate a digital signature 214 corresponding to a unique combination of one or more data fields available via an API.

In some embodiments, signature generation mode 210 may generate digital signature 214 based on mapping and/or analyzing a mapping between one or more fields identified in or associated with request 212 with one or more corresponding fields available from dynamic API 204. Digital signature 214 may be a bit array of n-width where n corresponds to the number of fields available via dynamic API 204. In some embodiments, each field available via dynamic API 204 may be associated with a position, e.g., position [x], of a bit contained in the bit array. Thus, after identifying the one or more requested fields, signature generation mode may generate a digital signature 214, e.g., a bit array, in which each bit corresponding to a requested field holds a value of True. In some embodiments, a translation table within the API may be used to map the bits holding a value of True to fields available via the API. In another embodiment, the digital signature may be resolved based on a translation table or logic within the database. One of ordinary skill in the art would recognize that other means and methods exist for resolving the digital signature and the above description is not limiting.

In some embodiments, the binary bit array may be converted to hexadecimal (and vice versa) such that requesting device 202 may store, use, and/or transmit the digital signature in hexadecimal form. In some embodiments, the requesting device 202 compresses the digital signature and stores the digital signature as a hexadecimal value or other compressed data format. In other embodiments, signature generation mode 210 may compress the digital signature prior to transmitting the digital signature to requesting device 202.

In some embodiments, the digital signature 214 may be any array, vector, bit vector, bitmap, multidimensional versions of such data structures that can hold a number of bits or store a value (e.g., string, integer, etc.) that can be translated into a set of bits.

Requesting device 202 may receive this digital signature 214 from signature generation mode 210 and store the digital signature 214 or provide the digital signature 214 to invocation mode 208. Upon receiving digital signature 214, invocation mode 208 may resolve the signature, e.g., by querying a translation table as described above, to identify the fields requested by requesting device 202 and generate a query to database(s) 206. Database(s) 206 may include a plurality of database objects, such as tables, views, materialized views, (here APIs), etc. that would provide data associated with the referenced subject matter (i.e., accounts 216, transactions 218, merchants 220, misc. account data 222). The plurality of database objects described herein is for illustrative purposes only and is not meant to be limiting on the structure or organization of database(s) 206.

In some embodiments, invocation mode 208 may generate a query to database(s) 206 such that segments containing fields identified in digital signature 214 are accessed, thereby increasing query efficiency. In some embodiments, invocation mode 208 mode may access database architecture information to generate an optimized query, such that the optimize query accesses the database segments and/or tables required to return information associated with the selected fields. Database architecture information may include, for example, information related to partitions, indexes, foreign keys, primary keys, etc. In another embodiment, a database of the system 200 may store dependency information related to the database objects in database(s) 206. In some examples, invocation mode 208 may transmit a data structure 224 containing the data returned by the query to requesting device 202. In some embodiments, data structure 224 may include XML data, formatted data, unformatted data, datasets, etc. or any other computer-readable format. In some embodiments, data structure 224 may be transmitted as one or more data packets or as one or more files containing the returned data.

In some embodiments, the system 200 may use database architecture information to optimize the query generated from the digital signature 214. For example, if no fields from a table are required then that table can be removed from the query. In another embodiment, table access can be optimized based on the fields required from that table. In yet another embodiment, system 200 may dynamically access a table from which no fields were requested if the table contains data needed to access, or to efficiently access, a requested field. Thus, invocation mode 208 may dynamically generate an executable query to return the requested fields, even if the digital signature does not explicitly include requests for any fields required to retrieve one or more of the requested fields.

Figure 3:
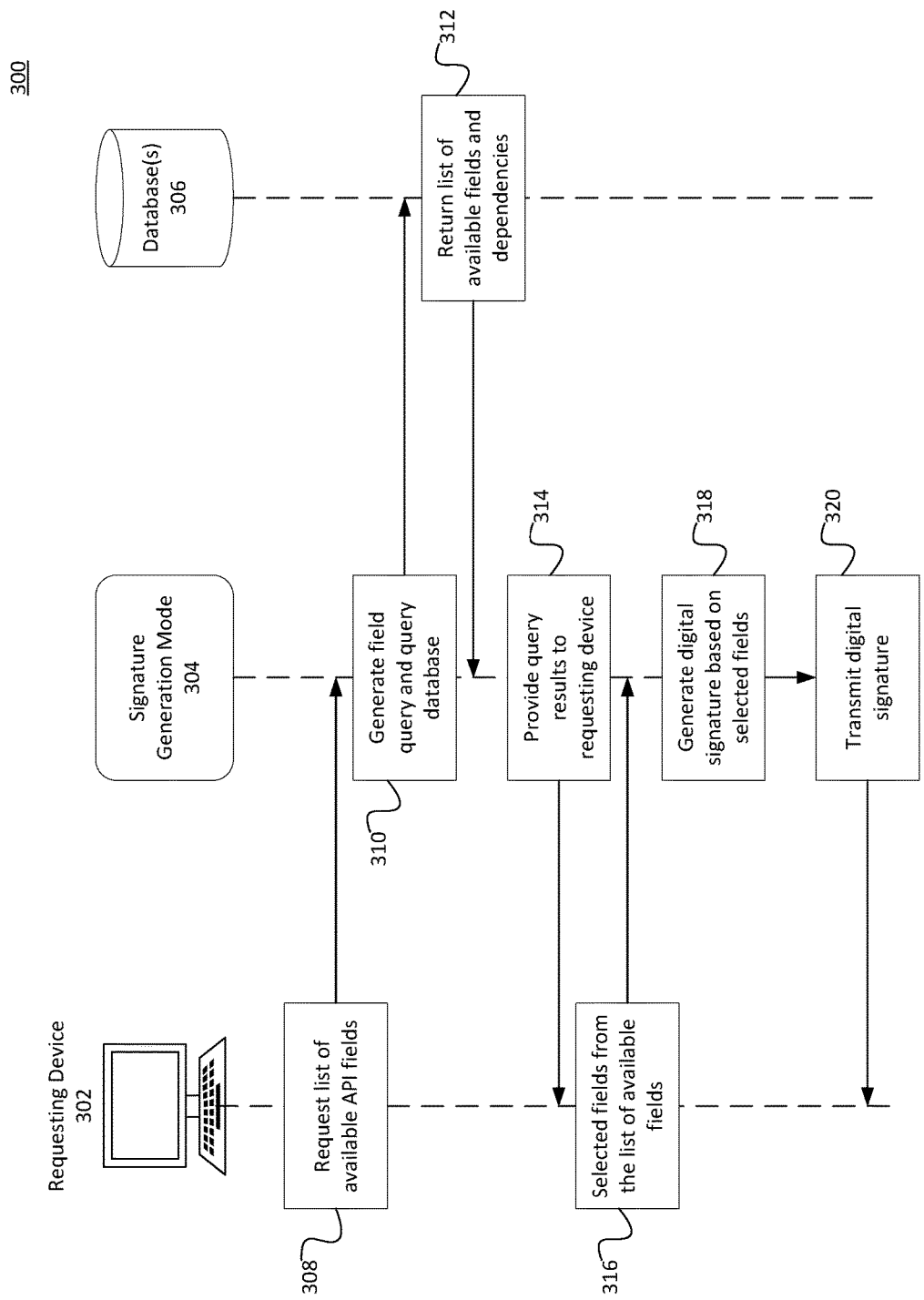
FIG. 3 depicts exemplary process for generating a digital signature, consistent with disclosed embodiments.

FIG. 3 is an illustration of an exemplary process 300 for generating a digital signature. For example, FIG. 3 illustrates the communication between a requesting device 302, a signature generation mode 304 of a dynamic API, and database(s) 306. Communications between the components may be executed via a network (e.g., network 106). In some examples, Signature generation mode 304 may be one of a plurality of modes of operation provided by a dynamic API (e.g., dynamic API 204).

At step 308, requesting device 302 may receive input from a user associated with an authorized client of service provider system 102. For example, requesting device 302 may receive input, via a GUI provided by service provider system 102 through, for example, a web browser or software application. In some examples, the input received from the user may indicate that the user wishes to initiate the creation of a digital signature, and requesting device 302 may send a request asking for a listing of available fields (e.g., full, partitioned, partial, etc.) to signature generation mode 304.

At step 310, upon receiving the initiation request, signature generation mode 304 may query database(s) 306 for a listing of all the fields currently available. At step 312, database(s) 306 may return a listing of all available fields (e.g., one, several, dozens, hundreds, thousands, etc.).

At step 314, signature generation mode 304 may transmit the returned list of available fields to requesting device 302. In some embodiments, signature generation mode 304 may transmit dependency information to requesting device 302, causing the GUI to display the dependencies to the user.

At step 316, requesting device 302 may receive input from the user, via a GUI, of desired fields from the list of available fields returned at step 314. Requesting device 302 may transmit, via network 106, the listing of selected fields to signature generation mode 304.

At step 318, signature generation mode 304 may generate a digital signature based on the selected fields. For example, as described above with reference to FIG. 2, signature generation mode may generate a bit array in which each position within the array maps to a corresponding data field associated with a dynamic API (e.g., dynamic API 204). In some examples, signature generation mode 304 may generate a digital signature by assigning a value of True to each bit mapped to a corresponding or otherwise mapped field that has been selected to be included as part of a combination of available data fields of a dynamic API, e.g., dynamic API 204, to be associated with a generated digital signature. In addition, Signature generation mode 304 also may assign a value of True to the bits mapped to the one or more additional fields. Signature generation mode 304 may then convert the generated bit array to a hex string, or other data format, prior to sending the digital signature to requesting device 302. The generated bits and/or associated values may be stored by requesting device 302 and then may be provided back to the dynamic API at a later time to reference the combination of data fields associated with the digital signature (based on position, mapping, etc.).

Thus, signature generation mode 304 may automatically generate a digital signature. Requesting device 302 may use this digital signature to generate an executable query when the digital signature is passed back to a dynamic API invocation mode, e.g., invocation mode 208.

At step 320, signature generation mode 304 may transmit the created digital signature to requesting device 302. The digital signature may be stored by a memory of requesting device 302 such that requesting device 302 may include the signature in future calls to the invocation mode, e.g., invocation mode 208.

Figure 4:
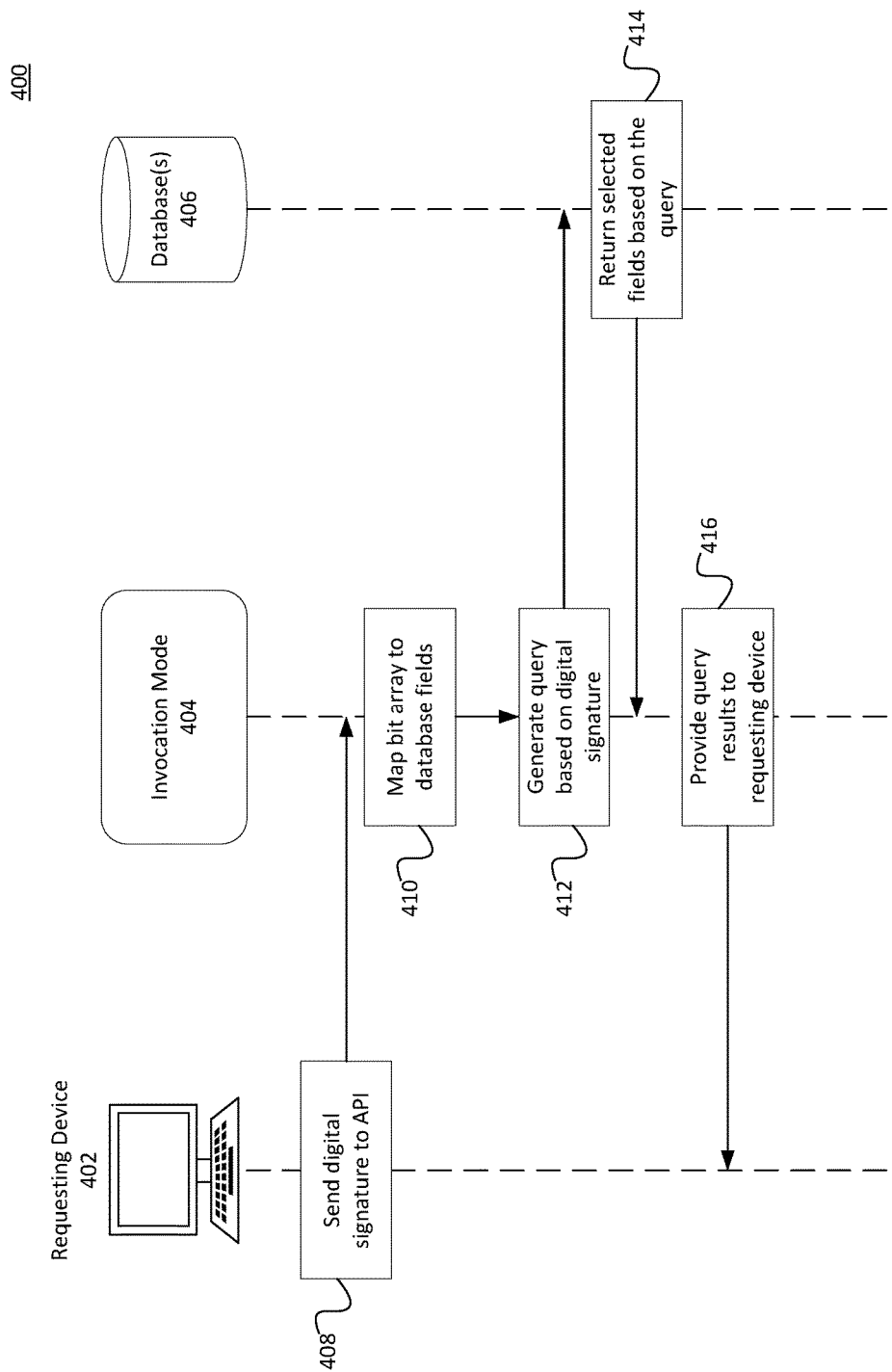
FIG. 4 depicts an exemplary process for using a digital signature with an inquiry API, consistent with disclosed embodiments.

FIG. 4 is an illustration of an exemplary process 400 for using a digital signature to query a database via a dynamic API. FIG. 4 illustrates the communication between a requesting device 402, an invocation mode 404, and database(s) 406. Communications between the components may be executed via a network, e.g., network 106. Invocation mode 404 may be configured to be one mode of operation provided by a dynamic API, e.g., dynamic API 204. Database(s) 406 may be the same as database(s) 110 and database(s) 306.

At step 408, requesting device 402 receives input from a GUI indicative of a request to call invocation mode 404. If more than one digital signature is stored by requesting device 402, the user may be prompted to select a digital signature to pass to invocation mode 404. Requesting device 402 sends the digital signature to invocation 404. In some embodiments, requesting device 402 may transmit the digital signature as part of an API call, e.g., as a parameter in the executable code of an application configured to receive and/or manipulate data associated with the fields indicated in the digital signature.

At step 410, invocation mode 404 receives the digital signature, indicative of the specific combination and/or subset of selected data fields, and identifies one or more selected fields available in database(s) 406. Invocation mode 404 may identify the one or more selected fields based on which bits in the digital signature are assigned a value of True. Based on these identified fields, invocation mode 404 may generate a query at step 412. The generated query may be constructed using one or more query languages, e.g., SQL, and may be configured to return data stored in the selected fields.

In some embodiments, invocation mode 404 may identify one or more selected fields having a dependency on one or more fields that were not selected in the digital signature. The invocation mode 404 may automatically include the required fields in the query, such that the query runs successfully without returning an error. For example, a primary key may be required to execute a query for a particular requested data field. Without the primary key, the query may return an error. Thus, by querying a dependency table, invocation mode 404 may identify the dependency of the requested field on the primary key such that an executable query may be generated for the digital signature.

Dependency information may indicate data fields for which a primary key, foreign key, index, and/or other parameters, are required to execute a query without error. The system 400 may include one or more exception and/or dependency tables storing dependency information for one or more fields accessible via the dynamic API. In some embodiments, new dependencies could exist after the digital signature is created. By accessing an exception or dependency table when generating a query based on a digital signature, invocation mode 404 may allow a user to use an existing signature even if new updates to the API and/or underlying database(s) occur. In some embodiments, dependency information (e.g., fields required to access requested fields that were not indicated in the digital signature) may be transmitted to the requesting device 402 in addition to the returned data.

At step 414, invocation mode 404 may run the generated query, causing database(s) 406 to return data associated with the fields selected in the digital signature. Invocation mode 404 may, at step 416, create a file or data structure containing the returned data and transmit the file, via network 106, to requesting device 402. The file may be, for example, an XML file, an object, a dataset, a recordset, tokenized values, or the like. In some embodiments, invocation mode 404 may return a file including a copy of the digital signature used to generate the dataset, for example, for validation/verification purposes.

Figure 5:
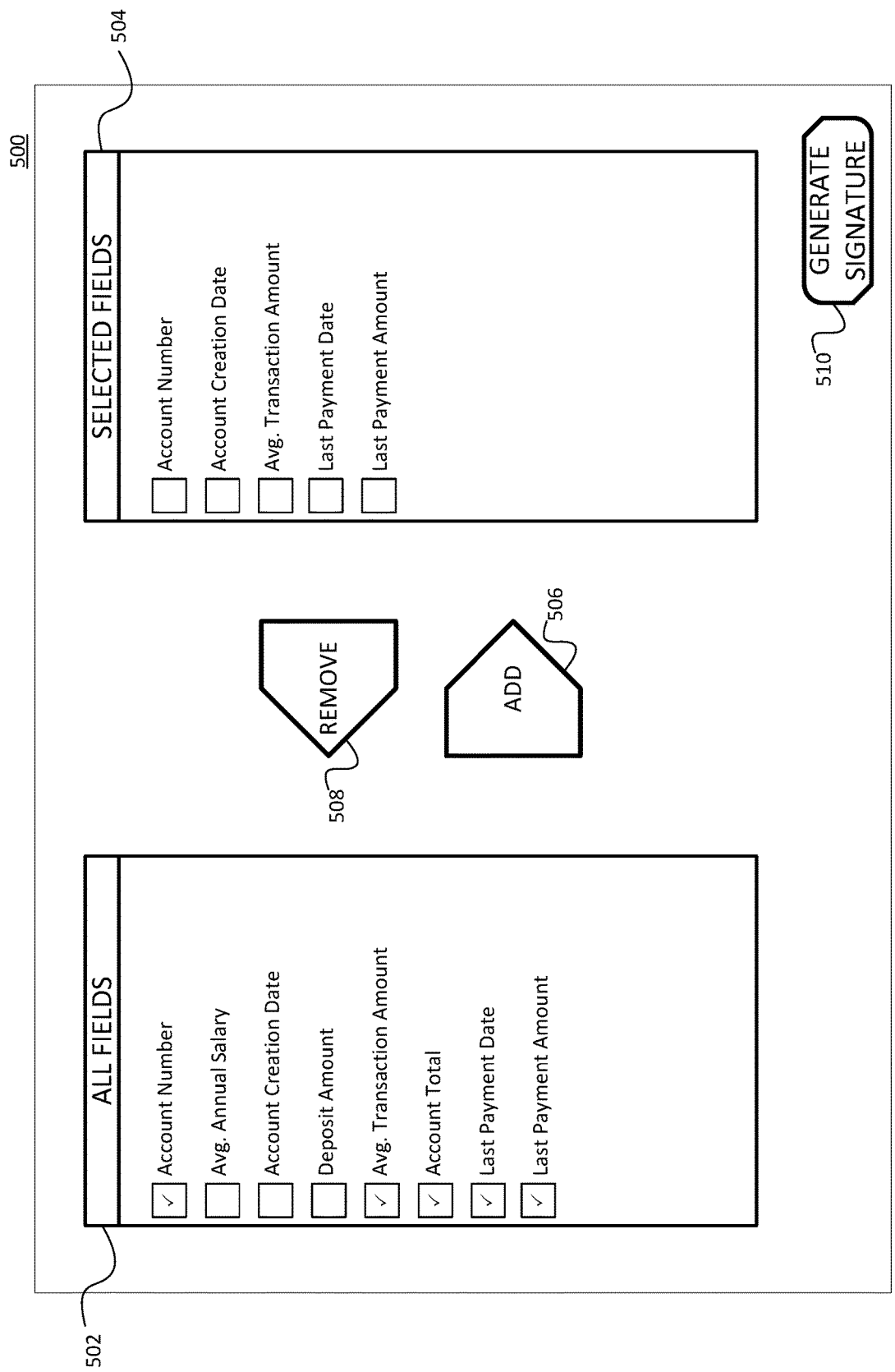
FIG. 5 depicts an exemplary graphical user interface (GUI) for generating a digital signature, consistent with disclosed embodiments.

FIG. 5 is an exemplary GUI 500 through which a user may generate a digital signature. GUI 500 may be displayed to a user via any of the previously described requesting devices 104, 202, 302, or 402. GUI 500 may cause the requesting device, i.e., the device executing an application which makes one or more calls to the dynamic API, to receive and present information that assists a user in creating one or more dynamic API digital signatures.

GUI 500 may provide a listing of some, any, and/or all fields 502 available via the dynamic API (e.g., dynamic API 108 or dynamic API 204). For example, GUI 500 may display fields received during the execution of process 300. Each selectable field may be selected by the user, via GUI 500, using, for example, a radio button, checkbox, or other graphical user interface selection tool or control.

GUI 500 may include functionality allowing the user to add fields to a list of selected fields 504 that will be associated with the digital signature. A user may add 506 fields to the selected fields list and may remove previous or automatically selected fields 508. Once the set of desired fields is displayed under selected fields, the user may select "Generate Signature" 510 or invoke other similar functionality that generates a unique digital signature associated with and/or representing selected fields 504. For example, when the digital signature is provided to a dynamic API (e.g., dynamic API 204) in an API call, for example via process 300, the generated digital signature allows the dynamic API to process an API call involving one or more data fields based on a single digital signature value associated with a subset of data fields that are available via the dynamic API.

In some embodiments, the system may allow for all fields for all APIs to be stored and available to a signature. When a request is made for a signature by a user, the execution of the response may cross multiple APIs to provide the signature. For example, a single digital signature may allow a user to access desired fields across two or more APIs. This configuration is advantageous as an optimal use of the underlying APIs to provide an efficient and seamless method through which systems may access one or more fields across a number of APIs.

As previously discussed, in some embodiments a dynamic API may be configured to operate in a number of modes, e.g., signature generation mode and invocation mode, which are interfaces through which to send and receive data from the dynamic API. In some embodiments the dynamic API (e.g., dynamic API 108 or dynamic API 204) may provide a test mode through which a user may test a digital signature to confirm and/or correct inclusion, exclusion, and/or accuracy of data fields that the digital signature is associated with and is to return without querying databases for the information associated with said fields. In some embodiments, the test mode may run within the application itself, might return a limited amount of data, might run against a materialized view, etc. to reduce overhead. Such a test mode increases efficiency of computer systems and computer networks by allowing a user to test one or more digital signatures without inducing processing overhead associated with the retrieval of large datasets.

Figure 6:
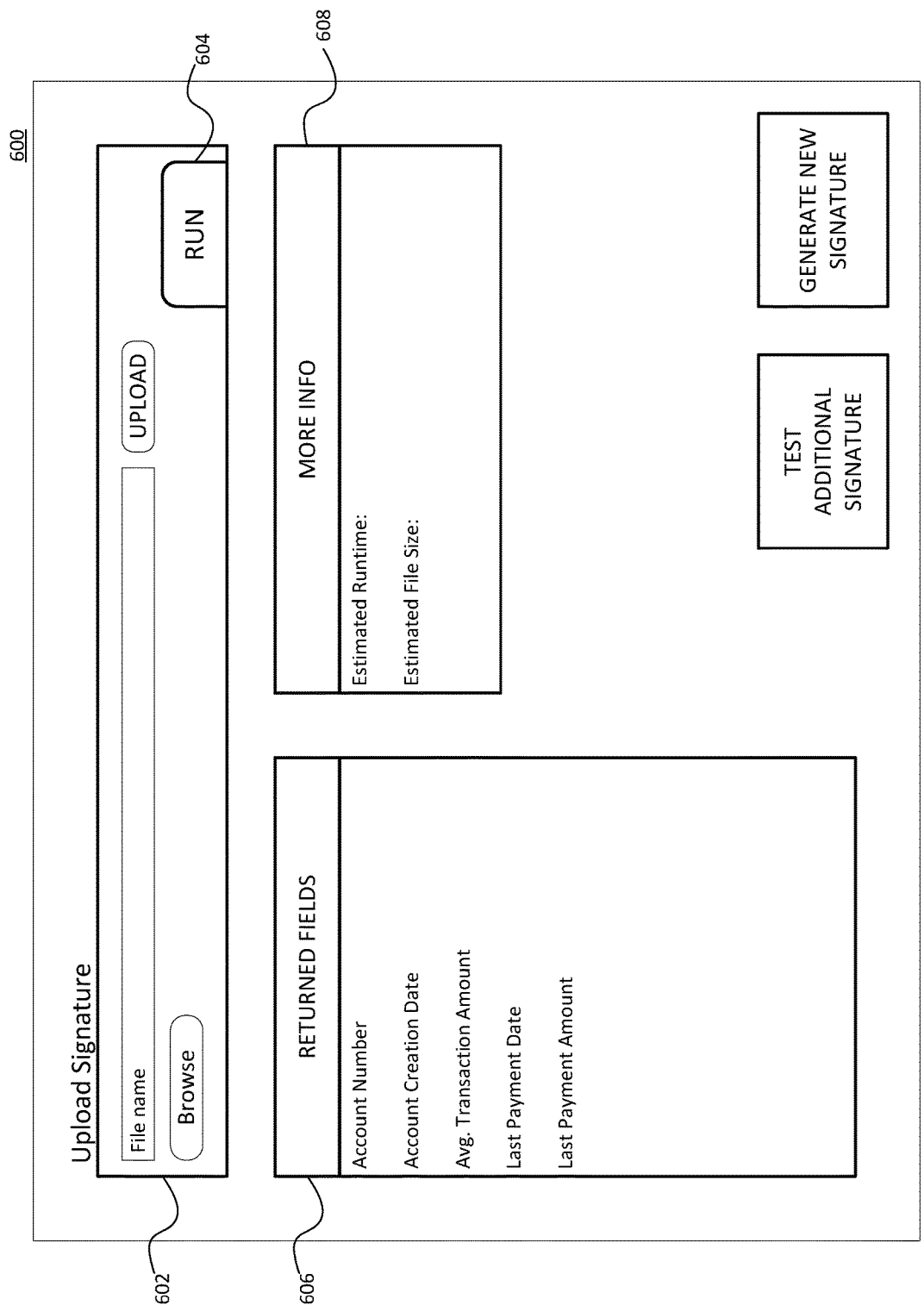
FIG. 6 depicts an exemplary GUI for testing a digital signature, consistent with disclosed embodiments.

FIG. 6 is an exemplary GUI 600 for communicating with a test mode of a dynamic API to test a digital signature in view of the dynamic API. GUI 600 may provide an interface through which a user may transmit a digital signature (602) from a requesting device, e.g., requesting device 104, 202, 302, 402. After transmitting the digital signature, a user may execute a test (604) of the digital signature.

In some embodiments, the digital signature may be passed, via network 106, to a dynamic API test mode. In some examples, the dynamic API test mode may query one or more database or data dictionary tables comprising data field and data field dependency information (e.g., step 310 of process 300). In various examples, the dynamic API test mode analyzes the digital signature to identify a subset of data fields available via a dynamic API, for example, based on a mapping of bits having a value of True to the fields available through the dynamic API. In some examples, the dynamic API test mode may also identify whether the data fields associated with the digital signature being tested are dependent upon other available fields, for example, based on further analyzing data field dependency data. In some examples, such dependencies also may be returned as part of dynamic API test mode results. In other embodiments, dependency information is not returned to the caller executing or testing a digital signature. The dynamic API test mode may cause GUI 600 to display a listing of the returned fields (606), which possibly may include data field dependencies. The GUI 600 may also receive from the dynamic API test mode and display additional information (608). Additional information 608 may include one or more computer system, computer application, and/or computer network performance metrics, such as an estimated run time of a generated query or operations associated a digital signature and/or an estimated size of an expected or actual dataset returned by a query. For example, the dynamic API test mode may analyze database metadata including for example, the data type of the selected fields, average size of the data stored in the selected fields, average runtime of frequently run queries, number of devices currently executing or that previously executed calls to the dynamic API, etc. In some embodiments, GUI 600 may generate and display a query that would result from passing a digital signature to the dynamic API. In another embodiment, the GUI 600 may display a digital signature submitted for testing, the underlying source code, and/or examples of the dynamic API calls associated with the execution of the digital signature itself.

Figure 7:
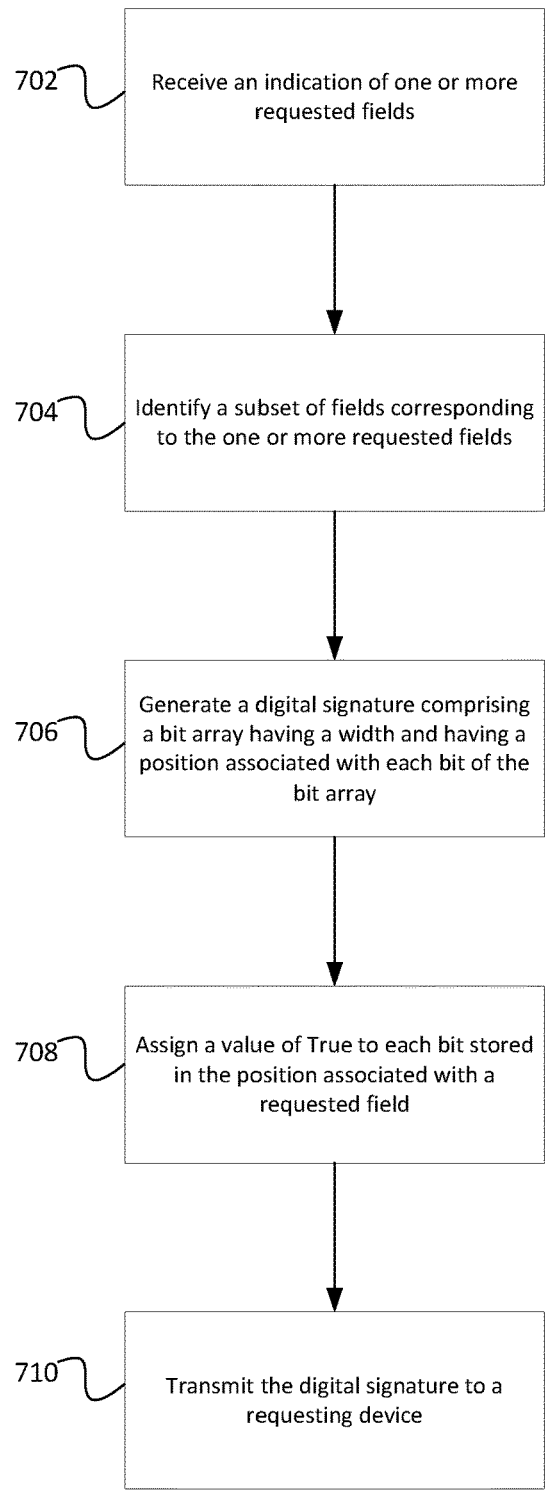
FIG. 7 depicts an exemplary method for generating a digital signature, consistent with disclosed embodiments.

FIG. 7 is a flowchart of an exemplary method 700 for generating a digital signature using a dynamic API, consistent with disclosed embodiments. Method 700 may be implemented using one or more processors of service provider system 102 and/or device 104. Method 700 may represent a computer-implemented method corresponding to process 300, described above.

At step 702, the one or more processors receive, by a signature generation mode of a dynamic API, e.g., dynamic API 204, a request indicating one or more requested fields. The request may be received, for example, via network 106, from requesting device 104 via a programmatic API call including the digital signature. In some embodiments, the request may be generated based on input from a user via a GUI, e.g., GUI 500, displayed on requesting device 104.

At step 704, the one or more processors may identify a subset of fields corresponding to the one or more requested fields. For example, signature generation mode, e.g., signature generation mode 210 or 304, may query a dictionary table associated with a database, e.g., database(s) 110, 206, 306, 406, to retrieve a set of fields associated with the dynamic API. In various examples, the one or more processors identify a set of fields corresponding the one or more requested fields. For example, the corresponding fields generally may be a unique subset or combination of data fields belonging to a full or larger set of data fields exposed and/or otherwise made available via a dynamic API.

At step 706, the one or more processors may generate a bit array having a width of n bits. The width of the bit array may correspond to the number of fields accessible via the dynamic API. The position of each bit in the bit array may correspond to each field in the set of fields accessible via the dynamic API. In some embodiments, a single bit is uniquely tied to a single field. The relationship between each bit and each field may be stored in a translation table as previously described. When a user indicates, for example, using a GUI (such as GUI 600 in FIG. 6), a field to be retrieved via dynamic API 108, the corresponding bit will be set to true in the digital signature 214 that is returned to the requesting device 202. When that user provides the digital signature 214, for example, to invocation mode 208 of dynamic API 204 by including that signature in an API call, the dynamic API determines the field(s) requested by the user based on which of the bit(s) in the digital signature 214 are set to true.

In some embodiments, dependency fields are evaluated at the time of invocation or execution. A user of a digital signature may not have knowledge of the underlying database structure from which fields are retrieved. For example, a user may request a field by executing an API call with a digital signature, e.g., digital signature 214. A database query to return the requested field may not be executable unless one or more additional fields are included in the database query. In some embodiments, these additional fields may not be presented to the user, e.g., in GUI 600 in FIG. 6. When the user provides the digital signature to the dynamic API, dependencies of the fields indicated in the digital signature are looked up, e.g., in a dependency table, and added to the database request, thereby generating an executable query to return the requested fields. Since dependencies are evaluated at invocation or execution time, the database may be modified without effecting existing digital signatures.

As an example, when a user requests a digital signature the user may select four fields to return via the dynamic API. At the time of execution (e.g., upon executing an API call with the digital signature), one or more of the four requested fields may be dependent on two additional fields. For example, a database query must access the two additional fields to return the four requested fields. The signature may represent the four requested fields, but not the two additional fields, e.g., because the user is unaware of the dependency or because the two additional fields are not selectable via GUI 600. When the dynamic API is called using the digital signature, the system evaluates the digital signature and the requested fields to determine dependency information accessed with the requested fields. A dependency table may indicate that the two additional fields are required to query a database to retrieve the requested fields. Based on this dependency information, the system (e.g., service provider system 102 or device 104) may include the two additional fields in the query to return the requested fields. At a later time, if additional dependencies are created, e.g., due to database modification or the addition of new fields to the database, these new dependencies are stored in the dependency table. Thus, when the user invokes the dynamic API with the original digital signature, the current dependency information is evaluated and any additional required fields are added to the query returning the requested fields. The process of adding dependencies to the request generated by the digital signature may occur without the user needing to obtain a new signature each time the underlying database(s) are modified, e.g., due to database maintenance.

At step 708, the one or more processors may assign a value of True to the bits having positions corresponding to the requested fields. In various examples, the one or more processors creates a dynamic digital signature that is unique to the subset of data fields for the dynamic API that have been requested by a user. In various examples, for each dynamic API, a unique digital signature exists for each combination of data fields. Such digital signatures may be used with a corresponding dynamic API(s) across authorized requesting devices, and more than one device of the same party and/or different parties may generate the same signature for the same combination of data fields associated with a respective dynamic API.

At step 710, the one or more processors transmit the generated digital signature to a requesting device, e.g., requesting device 104. In some embodiments, the signature generation mode may also collect and transmit information indicative of the performance of the digital signature. For example, signature generation mode may calculate and transmit an estimated runtime associated with the digital signature and/or an estimated CPU usage.

Figure 8:
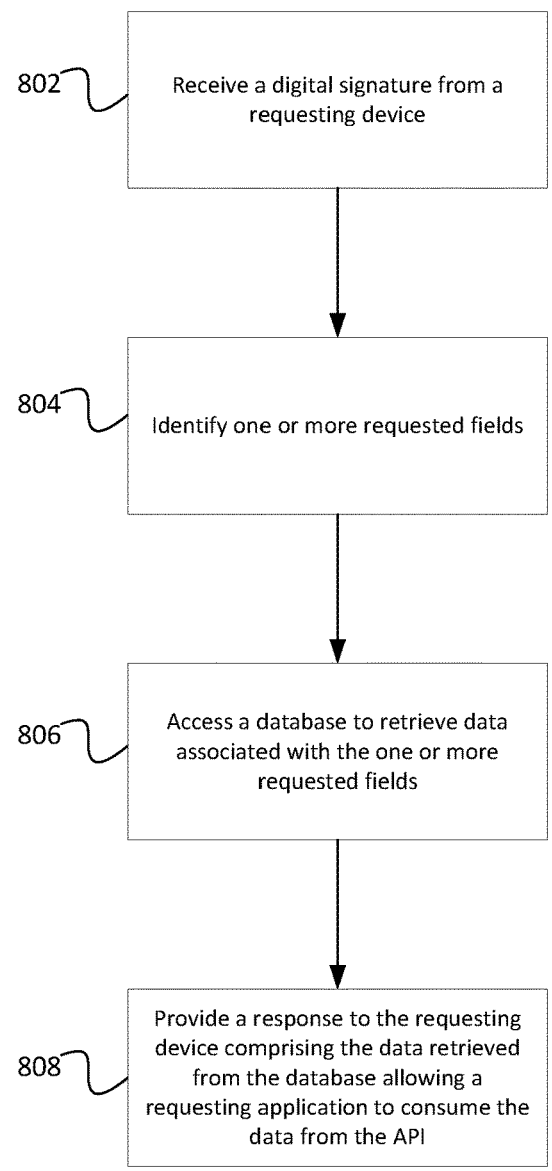
FIG. 8 depicts an exemplary method for using a digital signature with a dynamic API, consistent with disclosed embodiments.

FIG. 8 is a flowchart of an exemplary method 800 for using a dynamic API to retrieve data based on a digital signature, consistent with disclosed embodiments. Method 800 may be implemented using one or more processors of service provider system 102 and/or requesting device 104. Method 800 may represent a method corresponding to process 400, as described above.

At step 802, the one or more processors may receive a digital signature via a programmatic call to the dynamic API from a requesting device, e.g., requesting device 104. The digital signature may be received at an invocation mode configured to decode the digital signature and query one or more databases based on the information contained in the digital signature.

At step 804, the one or more processors may identify one or more requested fields. For example, the fields may be identified for use in response to or in association with an API request comprising the digital signature. In some embodiments, the invocation mode may receive a digital signature as a hex string. The invocation mode may convert the digital signature to a bit array. For example, the one or more processors may map one or more bits of the digital signature having a value of True, to one or more fields accessible via the dynamic API based on the respective position of each bit. In some embodiments, the system may resolve any dependencies, for example, by adding fields required to access one or more requested fields that may not have been included in the digital signature.

At step 806, the one or more processors may generate a query based on the identified requested fields. The query may be configured to access the database to retrieve information associated with the one or more requested fields. In some embodiments, database architecture information may be used to optimize the query or to render the query in an executable form. In another embodiment, invocation mode may deny a query, for example, if the requesting device does not have the appropriate credentials to access a requested field.

In some embodiments, each dynamic API may be secured so that each party/organization/user has their own credentials, authentication process, and/or authorization criteria. For example, prior to executing the generated query, the system may determine (e.g., by querying a permissions database) whether the user calling the API is authorized to access the requested fields.

At step 808, the one or more processors may provide a response (data) to the requesting device to cause a requesting application to consume the response from the API.

Certain features which, for clarity, are described in this specification in the context of separate embodiments may also be provided in combination in a single embodiment. Conversely, various features which, for brevity, are described in the context of a single embodiment may also be provided in multiple embodiments separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

What is claimed is:

1. A computer system comprising:
    a database storing information associated with a plurality of fields;
    one or more memories storing instructions; and
    one or more processors that execute the instructions to perform operations comprising:
        generating a graphical user interface configured to display fields available in the database, wherein the graphical user interface is displayed on a requesting device;
        receiving, via the graphical user interface, a selection of a first set of fields from among the available fields, wherein the first set of fields are available from an Application Programming Interface (API);
        generating a first digital signature based on the selection;
        transmitting the first digital signature to the requesting device;
        receiving the first digital signature from the requesting device;
        identifying, based on the first digital signature, one or more requested fields that are a subset of the first set of fields;
        generating and running a query to return data from the database, the query identifying the one or more requested fields identified based on the first digital signature, the one or more requested fields associated with the API from which the first set of fields indicated in the digital signature are available; and
    providing a response to the requesting device to cause a requesting application to consume the response from the API.

2. The system of claim 1, wherein the database is configured to store a dependencies table, the dependencies table containing dependency information indicating one or more required fields needed to generate a query to return at least one requested field of the first set of fields.

3. The system of claim 1, wherein the operations further comprise:
    receiving a second digital signature associated with a second set of fields from the requesting device;
    identifying, based on the second digital signature, one or more requested fields associated with the second set of fields; and
    accessing the database to retrieve the information associated with the one or more requested fields associated with the second set of fields, the one or more requested fields associated with the second set of fields associated with the API.

4. The system of claim 3, wherein the operations further comprise:
    providing a second response to the requesting device to cause a second requesting application to consume the second response from the API.

5. The system of claim 3, wherein the operations further comprise:
    providing a second response to the requesting device to cause the requesting application to consume the second response from the API.

6. The system of claim 3, wherein the first set of fields comprises at least one different field from the second set of fields.

7. The system of claim 1, wherein the first digital signature comprises a bit array with a dimension corresponding to the number of the first set of fields available from the API.

8. The system of claim 1, wherein the first digital signature is received as part of an API call.

9. The system of claim 1, wherein identifying the one or more requested fields that are a subset of the first set of fields comprises resolving the first digital signature based on a translation table.

10. A method for using a digital signature comprising:
    generating a graphical user interface configured to display fields available in the database, wherein the graphical user interface is displayed on a requesting device;
    receiving, via the graphical user interface, a selection of a first set of fields from among the available fields, wherein the first set of fields are available from an Application Programming Interface (API);
    generating a first digital signature based on the selection;
    transmitting the first digital signature to the requesting device;
    receiving the first digital signature from the requesting device;
    identifying, based on the first digital signature, one or more requested fields that are a subset of the first set of fields;
    generating and running a query to return data from the database, the query identifying the one or more requested fields identified based on the first digital signature, the one or more requested fields associated with the API from which the first set of fields indicated in the digital signature are available; and
    providing a response to the requesting device to cause a requesting application to consume the response from the API.

11. The method of claim 10, wherein the database is configured to store a dependencies table, the dependencies table containing dependency information indicating one or more required fields needed to generate a query to return at least one requested field of the first set of fields.

12. The method of claim 10, wherein the method further comprises:
    receiving a second digital signature associated with a second set of fields from the requesting device;
    identifying, based on the second digital signature, one or more requested fields associated with the second set of fields; and
    accessing the database to retrieve the information associated with the one or more requested fields associated with the second set of fields, the one or more requested fields associated with the second set of fields associated with the API.

13. The method of claim 12, wherein the method further comprises:
    providing a second response to the requesting device to cause a second requesting application to consume the second response from the API.

14. The method of claim 12, wherein the method further comprises:
    providing a second response to the requesting device to cause the requesting application to consume the second response from the API.

15. The method of claim 12, wherein the first set of fields comprises at least one different field from the second set of fields.

16. The method of claim 10, wherein the first digital signature comprises an array of one or more bits.

17. The method of claim 16, wherein each of the one or more bits is associated with a position in the array and wherein each position in the array is associated with a field in the database.

18. The method of claim 17, wherein a requested field is associated with a bit having a value of True in the array.

19. A non-transitory computer-readable medium including instructions executable by one or more processors to carry out operations comprising:
- generating a graphical user interface configured to display fields available in the database, wherein the graphical user interface is displayed on a requesting device;
- receiving, via the graphical user interface, a selection of a first set of fields from among the available fields, wherein the first set of fields are available from an Application Programming Interface (API);
- generating a first digital signature based on the selection;
- transmitting the first digital signature to the requesting device;
- receiving the first digital signature from the requesting device;
- identifying, based on the first digital signature, one or more requested fields that are a subset of the first set of fields;
- generating and running a query to return data from the database, the query identifying the one or more requested fields identified based on the first digital signature, the one or more requested fields associated with the API from which the first set of fields indicated in the digital signature are available; and
- providing a response to the requesting device to cause a requesting application to consume the response from the API.

* * * * *